(12) United States Patent
Lee et al.

(10) Patent No.: US 8,782,243 B2
(45) Date of Patent: Jul. 15, 2014

(54) RESOURCE MANAGEMENT APPARATUS AND METHOD FOR SUPPORTING CLOUD-BASED COMMUNICATION BETWEEN UBIQUITOUS OBJECTS

(75) Inventors: Gyu-Myoung Lee, Gyeonggi-do (KR); Jeong-Yun Kim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 292 days.

(21) Appl. No.: 13/308,906

(22) Filed: Dec. 1, 2011

(65) Prior Publication Data
US 2012/0144041 A1    Jun. 7, 2012

(30) Foreign Application Priority Data

Dec. 2, 2010  (KR) .................... 10-2010-0122183

(51) Int. Cl.
*G06F 15/16*  (2006.01)
(52) U.S. Cl.
USPC .......................................................... 709/226
(58) Field of Classification Search
CPC ..... H04L 2012/5631; H04L 67/1002–67/1023
USPC .......................... 709/205, 213–229, 240, 248
See application file for complete search history.

(56) References Cited

U.S. PATENT DOCUMENTS

| | | | |
|---|---|---|---|
| 2007/0072618 A1* | 3/2007 | Freytis et al. | 455/452.2 |
| 2008/0010381 A1* | 1/2008 | Barraclough et al. | 709/228 |
| 2008/0091806 A1* | 4/2008 | Shen et al. | 709/223 |
| 2010/0306377 A1* | 12/2010 | DeHaan et al. | 709/226 |
| 2011/0016214 A1* | 1/2011 | Jackson | 709/226 |

OTHER PUBLICATIONS

Cloud-based Ubiquitous Networking and Services for Object-to-Object Communications, Lee et al., Oct. 1, 2010, pp. 1-12.

* cited by examiner

*Primary Examiner* — Brendan Higa
(74) *Attorney, Agent, or Firm* — Staas & Halsey LLP

(57) ABSTRACT

A resource management apparatus and method for supporting cloud-based communication between ubiquitous objects are provided. According to the resource management apparatus and method, it is possible to effectively manage resources such that a ubiquitous object can perform cloud-based communication. Therefore, it is possible to provide any desired amount of cloud resources to a ubiquitous object that is equipped with limited resources and thus to allow the ubiquitous object to smoothly communicate with a correspondent object.

17 Claims, 6 Drawing Sheets

| OBJECT ID | SERVICE TYPE | CLOUD RESOURCE TYPE | CLOUD RESOURCE LOCATION | PRIORITY | ... |
|---|---|---|---|---|---|
| 1 | TYPE-1 | MEMORY | LOCATION 2 | HIGH | ... |
| 2 | TYPE-3 | STORAGE | LOCATION 4 | MEDIUM | ... |
| 3 | TYPE-4 | BANDWIDTH | LOCATION 1 | MEDIUM | ... |
| 4 | TYPE-2 | SOFTWARE | LOCATION 3 | LOW | ... |
| ... | ... | ... | ... | ... | ... |

FIG. 3

| CLOUD RESOURCE ID | CLOUD RESOURCE TYPE | CLOUD RESOURCE LOCATION | CLOUD RESOURCE AVAILABILITY | CLOUD RESOURCE RESERVATION | ... |
|---|---|---|---|---|---|
| 1 | SOFTWARE | LOCATION 3 | 97 | 3 | ... |
| 2 | MEMORY | LOCATION 2 | 3 | 1 | ... |
| 3 | STORAGE | LOCATION 4 | 300 | 50 | ... |
| 4 | BANDWIDTH | LOCATION 1 | 90 | 10 | ... |
| ... | ... | ... | ... | ... | ... |

FIG. 4

| OBJECT ID | SERVICE TYPE | CLOUD RESOURCE TYPE | CLOUD RESOURCE LOCATION | PRIORITY | ... |
|---|---|---|---|---|---|
| 1 | TYPE-1 | MEMORY | LOCATION 2 | HIGH | ... |
| 2 | TYPE-3 | STORAGE | LOCATION 4 | MEDIUM | ... |
| 3 | TYPE-4 | BANDWIDTH | LOCATION 1 | MEDIUM | ... |
| 4 | TYPE-2 | SOFTWARE | LOCATION 3 | LOW | ... |
| ... | ... | ... | ... | ... | ... |

RESOURCE MANAGEMENT APPARATUS AND METHOD FOR SUPPORTING CLOUD-BASED COMMUNICATION BETWEEN UBIQUITOUS OBJECTS

CROSS-REFERENCE TO RELATED APPLICATION(S)

This application claims the benefit under 35 U.S.C. §119(a) of Korean Patent Application No. 10-2010-0122183, filed on Dec. 2, 2010, in the Korean Intellectual Property Office, the entire disclosure of which is incorporated herein by reference for all purposes.

BACKGROUND

1. Field

The following description relates to a resource management technique, and more particularly, to a resource management apparatus and method for supporting cloud-based communication between ubiquitous objects.

2. Description of the Related Art

The term 'ubiquitous' is derived from the Latin word 'ubique' meaning "existing or being everywhere at the same time; constantly encountered." According to the ITU Telecommunication Standardization Sector (ITU-T), which is one of the sectors of the International Telecommunication Union (ITU), ubiquitous networks are defined as networks that can provide and support a variety of applications and services and any devices anywhere anytime.

Therefore, in a future network environment, people can access networks anywhere, anytime, all objects can become the subjects or targets of services, and services can vary depending on the circumstances.

Accordingly, different services need to be provided to different objects or for different locations, and authentication of legitimate users for services is needed.

A ubiquitous network environment is directed toward a variety of network terminals such as wired terminals (for example, a personal computer (PC), a telephone, and a TV), wireless terminals (for example, a personal digital assistant (PDA), a laptop computer, and a smart phone), Radio-Frequency IDentification (RFID) sensors, medical equipment, navigation devices for vehicles, integrated circuit (IC) cards, home servers, and other terminals for new applications and services. In such a ubiquitous network environment, unlike in an earlier communication environment, objects that become the targets of communication may have restrictions regarding power supply, computing power, and size. Therefore, a method is needed to effectively manage resources to support smooth communication between objects in a ubiquitous environment.

SUMMARY

The following description relates to a resource management technique to support cloud-based communication between ubiquitous objects. In the resource management technique, resources may be managed to support cloud-based communication between objects in a ubiquitous environment, and thus to allow the objects to properly communicate with one another in the ubiquitous environment.

In one general aspect, there is provided a resource management apparatus for supporting cloud-based communication between ubiquitous objects, the resource management apparatus including: a service classification unit configured to classify a service requested by a ubiquitous object based on properties of the requested service; a resource search unit configured to search for cloud resources available for services that are classified by the service classification unit; a resource management unit configured to synchronize the ubiquitous object with the cloud resources that are found by the resource search unit.

Other features and aspects may be apparent from the following detailed description, the drawings, and the claims.

BRIEF DESCRIPTION OF THE DRAWINGS

FIG. 3 is a resource management table that is managed by an example of a resource management apparatus for supporting cloud-based communication between ubiquitous objects.

FIG. 4 is a service management table that is managed by an example of a resource management apparatus for supporting cloud-based communication between ubiquitous objects.

Figure 1:
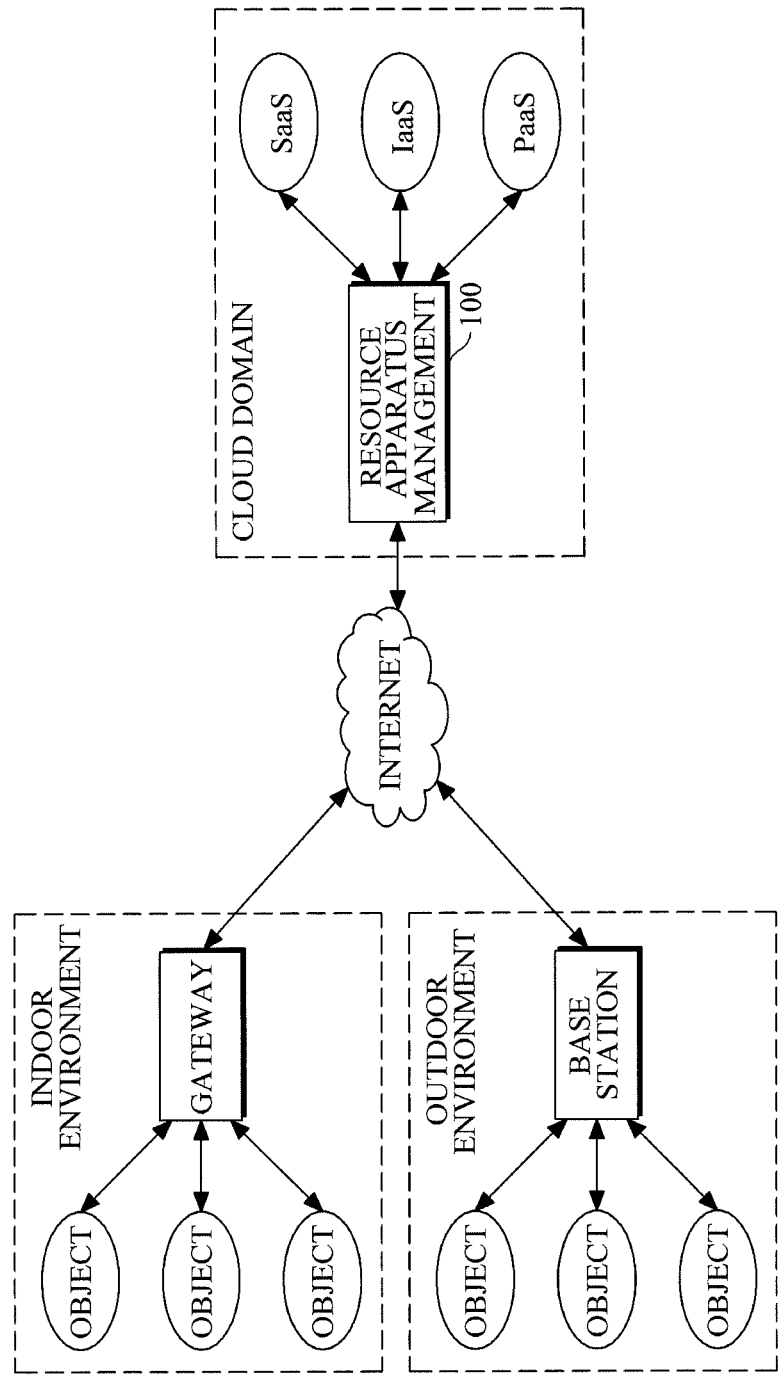
FIG. 1 is a diagram illustrating an example of a system including a resource management apparatus for supporting cloud-based communication between ubiquitous objects.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Cloud computing is a technique for allowing users to perform any desired tasks by accessing a high-performance large-scale system in which an operating system (OS) and various applications are installed. Cloud computing is a future-oriented technique that is clearly distinguished from an earlier computing environment in which each terminal is driven with their own hardware.

Cloud computing may provide various information technology (IT)-related functions as services, and may thus allow users to easily use various services from the internet without requiring expertise in infrastructure that supports the various services. Cloud computing has the following layers:

(1) Software as a Service (SaaS) is a software delivery model and is deemed an extended application service provider (ASP) or a next-generation ASP. An ASP is an application delivery service that allows users to use a variety of IT solutions through network infrastructure without requiring expensive hardware and software.

(2) Infrastructure as a Service (IaaS) is an infrastructure delivery model for delivering on demand computer infrastructure, and particularly, an environment in which servers, storages, and network equipment are virtualized.

(3) Platform as a Service (PaaS) is an extension of SaaS and is a platform delivery model capable of facilitating deployment of applications without the cost and complexity of establishing a computing platform.

The Internet is expected to evolve into a network that can allow a variety of new objects (such as, for example, terminals) to communicate with one another and to be provided with various services through cloud computing.

To smoothly provide any desired communication services, a mechanism for effectively managing cloud resources is needed. The cloud resources may include software for various applications and hardware for various applications such as, for example, storages, memories, computing power and various other equipment.

Various aspects are directed toward managing resources to support cloud-based communication between objects in a ubiquitous environment.

The term 'ubiquitous object,' as used herein, indicates an object in a ubiquitous environment.

FIG. 1 illustrates an example of a system including a resource management apparatus for supporting cloud-based communication between objects in a ubiquitous environment. Referring to FIG. 1, objects in an indoor environment, i.e., indoor objects, may include home is appliances, communication terminals, surveillance cameras, and the like, and may be connected wiredly or wirelessly to a gateway. Various access interfaces such as, for example, WiFi, ZigBee, Bluetooth, and NFC, may be used in the indoor environment.

Objects in an outdoor environment, i.e., outdoor objects, may include various mobile objects such as, for example, vehicles, may communicate with satellites or global positioning system (GPS) satellites, and may be connected to the internet via a wireless base station.

Since ubiquitous objects, unlike typical communication terminals such as personal computers, are mostly not equipped with a high-performance computing environment, an environment in which objects can be provided with various applications and services through cloud computing may be taken into consideration in the example illustrated in FIG. 1.

A resource management apparatus 100 for supporting cloud-based communication between ubiquitous objects may be installed in a cloud domain. The resource management apparatus 100 may manage cloud resources requested by ubiquitous objects, and may provide the cloud resources to the ubiquitous objects to provide various services.

Figure 2:
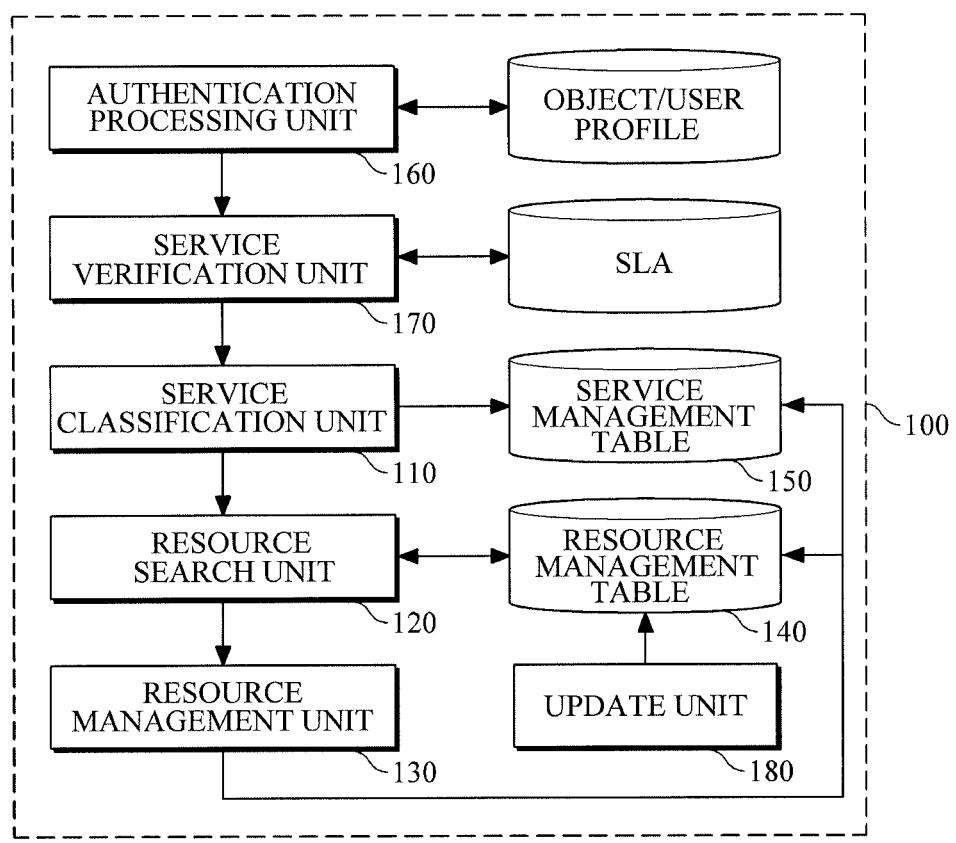
FIG. 2 is a diagram illustrating an example of a resource management apparatus for supporting cloud-based communication between ubiquitous objects.

FIG. 2 illustrates an example of a resource management apparatus for supporting cloud-based communication between ubiquitous objects. Referring to FIG. 2, resource management apparatus 100 includes a service classification unit 110, a resource search unit 120, and a resource management unit 130.

The service classification unit 110 may classify a service requested by a ubiquitous object based on the properties of the requested service. A request message that the ubiquitous object transmits to the resource management apparatus 100 in connection with the requested service may include identification information of the ubiquitous object and cloud resource type information corresponding to the type of cloud resources requested by the ubiquitous object.

For example, the identification information of the ubiquitous object may be unique information (such as, for example, a unique number) that identifies the ubiquitous object. The resource management apparatus 100 may store an object profile including the identification information of the ubiquitous object.

For example, the cloud resource type information may indicate the type of cloud resources requested by the ubiquitous object, such as, for example, a memory, a storage, bandwidth, or software. The properties of the requested service may be identified based on the cloud resource type information.

In response to the properties of the requested service being identified, the service classification unit 110 may classify the requested service. For example, the classification unit 110 may classify the requested service into one of type-1, type-2, type-3, and type-4 services. A type-1 service may be an urgent service that needs to be urgently provided by readily allocating cloud resources. A type-2 service may be a periodic service that needs to be provided repeatedly at regular intervals of time. A type-3 service may be an on-demand service. A type-4 service may be a usage service with a predefined pattern.

The resource search unit 120 may search for cloud resources available for services classified as being of the same type as the requested service by the service classification unit 110. Since ubiquitous objects are mostly equipped with limited resources, the resource search unit 120 may search a high-performance cloud domain for available cloud resources. An example of searching for cloud resources will be described later in further detail.

In response to cloud resources available for services of the same type as the requested service being found, the resource management unit 130 may synchronize the found cloud resources with the ubiquitous object. For example, the resource management unit 130 may allocate the found cloud resources to the ubiquitous object, may reserve the found cloud resources for the ubiquitous object, or may modify the found cloud resources for the ubiquitous object.

For example, the allocation of cloud resources by the resource management unit 130 may be performed in response to the requested service being related to the use of resources. For example, the reservation of cloud resources by the resource management unit 130 may be performed in response to the requested service being related to the reservation of resources. For example, the modification of cloud resources by the resource management unit 130 may be performed in response to the requested service being related to the modification of resources.

The resource management apparatus 100 may manage resources to support cloud-based communication between ubiquitous objects. Accordingly, ubiquitous objects with limited resources may be supported by any desired amount of cloud resources and may thus be able to smoothly communicate with one another.

The resource management apparatus 100 may also include a resource management table 140. FIG. 3 is an example of the resource management table 140.

Referring to FIG. 3, resource management table 140 includes cloud resource identification information, cloud resource type information, cloud resource location information, cloud resource availability information, and cloud resource reservation information.

The cloud resource identification information may be unique information that identifies cloud resources. For example, different numbers may be allocated to different cloud resources as the cloud resource identification information.

The cloud resource type information may be information indicating the type of cloud resources such as, for example, memory, storage, bandwidth, software, or the like.

The cloud resource location information may be information indicating the location of cloud resources. For example, the cloud resource location information may include an IP address, a memory address, or database index information.

The cloud resource availability information may be information indicating the amount of cloud resources available. The cloud resource reservation information may be information indicating the amount of cloud resources reserved.

Ubiquitous objects are mostly equipped with limited resources. To use cloud resources available in a high-performance cloud domain, the resource management apparatus 100 may search the cloud domain for available cloud resources with the aid of the resource search unit 120. For example, the resource search unit 120 may determine whether there are available cloud resources in the cloud domain with reference to the cloud resource available information in the resource management table 140.

The resource management apparatus 100 may manage resources to support cloud-based communication between ubiquitous objects. Accordingly, ubiquitous objects with limited resources may be supported by any desired amount of cloud resources and may thus be able to smoothly communicate with one another. For example, the resource management unit 130 may be configured to update the resource management table 140 by synchronizing cloud resources with a ubiquitous object that requests the cloud resources as a service.

In response to cloud resources being allocated, reserved, or modified, the resource management unit 130 may actively update the information in the resource management table 140, including the cloud resource availability information and the cloud resource reservation information. Accordingly, it is possible to effectively manage cloud resources.

The resource management apparatus 100 may also include a service management table 150. FIG. 4 is an example of the service management table 150 that is managed by the resource management apparatus 100.

Referring to FIG. 4, service management table 150 includes ubiquitous object identification information, service type information, cloud resource type information, cloud resource location information, and priority information.

The ubiquitous object identification information may be unique information that identifies each ubiquitous object. For example, different numbers may be allocated to different ubiquitous objects as the ubiquitous object identification information.

The service type information may be information indicating the type of a service requested by each ubiquitous object, which is determined by the service classification unit 110. For example, a service requested by each ubiquitous object may be classified into one of type-1, type-2, type-3, and type-4 services. A type-1 service may be an urgent service that needs to be urgently provided by readily allocating cloud resources. A type-2 service may be a periodic service that needs to be provided repeatedly at regular intervals of time. A type-3 service may be an on-demand service. A type-4 service may be a usage service with a predefined pattern.

The cloud resource type information may be information indicating the type of cloud resources such as, for example, memory, storage, bandwidth, software, or the like.

The cloud resource location information may be information indicating the location of cloud resources. For example, the cloud resource location information may include an IP address, a memory address, or database index information.

The priority information may be information indicating the priority levels of various types of cloud resources to be provided. For example, the priority information may classify the priority level of cloud resources as 'high,' 'medium,' or 'low.'

To effectively allocate cloud resources, the resource management apparatus 100 may classify a service requested by a ubiquitous object according to the properties of the requested service with the aid of the service classification unit 110. For example, the service classification unit 110 may record identification information of the ubiquitous object, the type of the requested service, the type of cloud resources requested by the ubiquitous object, and the priority level of the type of the requested cloud resources in the service management table 150.

In response to a ubiquitous object requesting a service, information corresponding to the ubiquitous object, the requested service, and cloud resources requested by the ubiquitous object may be recorded in the service management table 150. Accordingly, the service management table 150 may be updated, and service information corresponding to the requested service may be registered in the service management table 150.

The resource management apparatus 100 may search for cloud resources available for a service requested by a ubiquitous object with reference to the resource management table 140 with the aid of the resource search unit 120, and may synchronize the found cloud resources with the ubiquitous object. For example, the resource management unit 130 may be configured to record location information of the found cloud resources in the service management table 150 after the synchronization of the ubiquitous object with the found cloud resources.

Accordingly, the resource management table 140 and the service management table 150 may be synchronized with each other. Thus, it is possible to effectively management cloud resources for a service requested by each ubiquitous object.

The resource management apparatus 100 may also include an authentication processing unit 160. The authentication processing unit 160 may perform authentication and authorization processes on a ubiquitous object that requests a service.

The authentication processing unit 160 may determine whether a ubiquitous object that requests a service is a legitimate ubiquitous object and verify the rights of the ubiquitous object by performing authentication and authorization on the ubiquitous object.

For example, the authentication processing unit 160 may authenticate and authorize a ubiquitous object that requests a service by comparing previously-registered object profile information or profile information corresponding to a user of the ubiquitous object with identification information of the ubiquitous object.

The resource management apparatus 100 may also include a service verification unit 170. The service verification unit 170 may verify a service level agreement (SLA) corresponding to a service requested by a ubiquitous object.

SLA is a part of a service contract for guaranteeing certain levels of service attributes that represent the quality of service (QoS). The service verification unit 170 may improve QoS by verifying an SLA corresponding to a service requested by a ubiquitous object.

The resource management apparatus 100 may also include an update unit 180. The update unit 180 may update the resource management table 140 by periodically monitoring cloud resources. In this example, it is possible to keep the resource management table 140 up-to-date by periodically monitoring cloud resources with the use of the update unit 180. Thus, it is possible to effectively manage cloud resources by searching for cloud resources available for a service requested by a ubiquitous object with reference to the resource management table 140.

Figure 5:
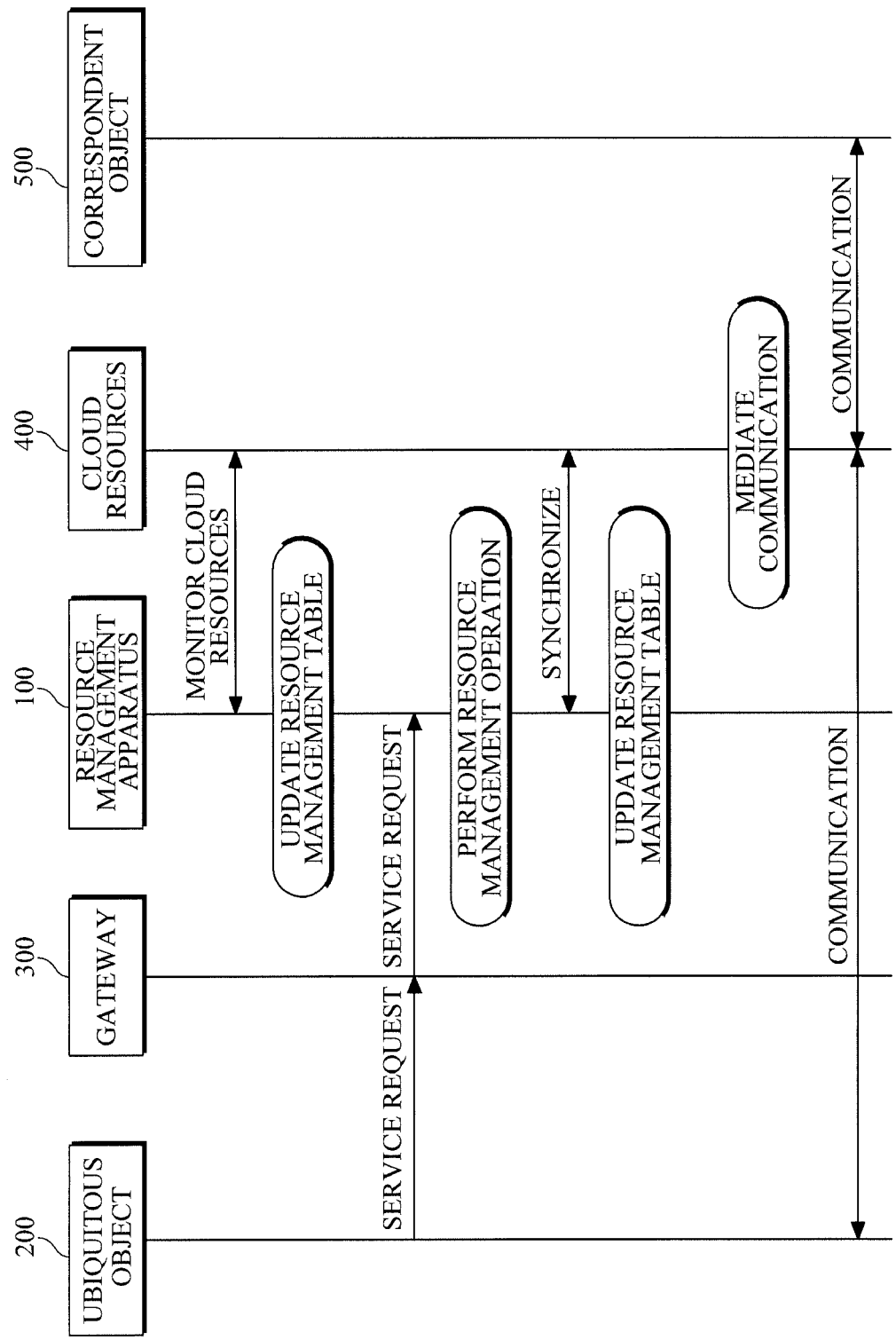
FIG. 5 is a diagram illustrating an example of the operation of a resource management apparatus for supporting cloud-based communication between ubiquitous objects.

FIG. 5 illustrates an example of the operation of the resource management apparatus 100.

Referring to FIG. 5, the resource management apparatus 100 may keep a resource management table up-to-date by periodically monitoring cloud resources and updating the resource management table with the results of the monitoring. A ubiquitous object 200 may issue a service request via a gateway 300.

The service request may be a request for the use of resources, for the reservation of the use of resources, or for the modification of resources.

The resource management apparatus 100 may perform a resource management operation that includes performing authentication and authorization on the ubiquitous object 200, verifying an SLA corresponding to a service requested by the ubiquitous object 200, determining the type of the requested service based on the properties of the requested service, and searching for cloud resources available for services of the determined type.

The resource management apparatus 100 may synchronize cloud resources 400 that are found during the resource management operation with the ubiquitous object 200, and may update the resource management table.

In response to the ubiquitous object 200 being synchronized with the cloud resources 400, the cloud resources 400 may approach a correspondent object 500 that the ubiquitous object 200 wishes to communicate with, and may mediate communication between the ubiquitous object 200 and the correspondent object 500.

The resource management apparatus 100 may manage resources in such a manner that the ubiquitous object 200 can perform cloud-based communication along with the correspondent object 500. Therefore, it is possible to provide any desired amount of cloud resources to the ubiquitous object 200 that is equipped with limited resources and thus to allow the ubiquitous object 200 to smoothly communicate with the correspondent object 500.

An example of a cloud resource management operation performed by the resource management apparatus 100 is described with reference to FIG. 6.

Figure 6:
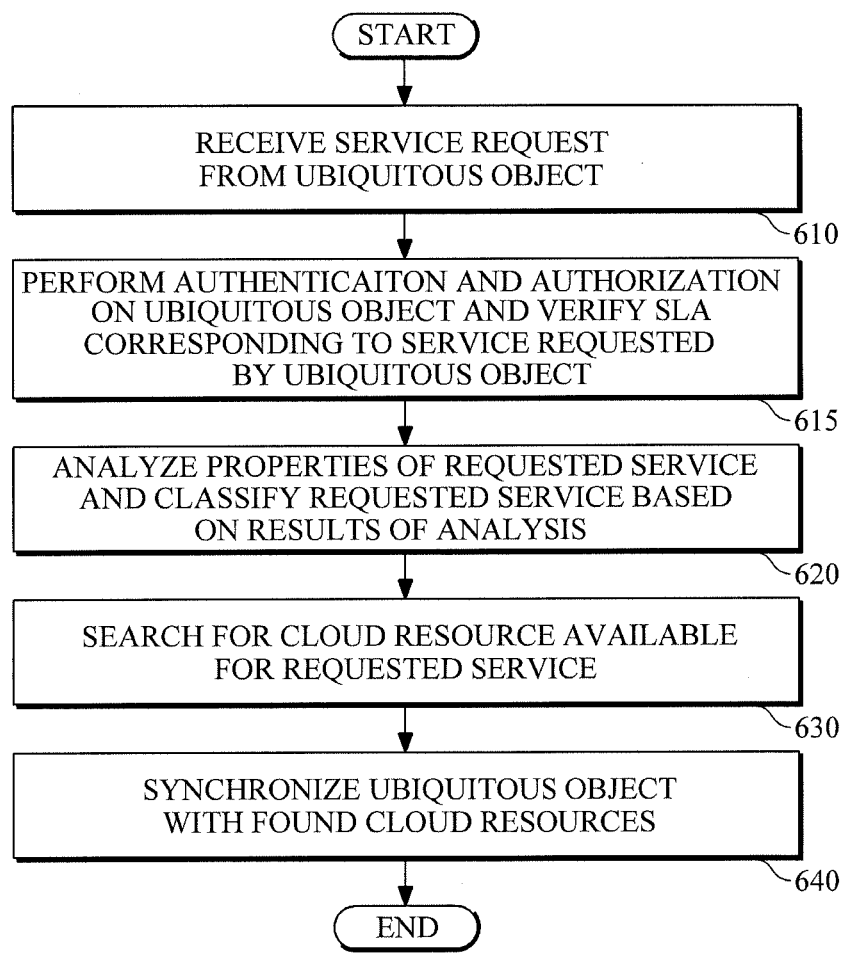
FIG. 6 is a flowchart illustrating an example of a resource management method for supporting cloud-based communication between ubiquitous objects.

FIG. 6 illustrates an example of a resource management method for supporting cloud-based communication between ubiquitous objects.

Referring to FIG. 6, in 610, in response to a ubiquitous object requesting a service that includes an allocation, reservation, or modification of cloud resources, a resource management apparatus may receive a service request from the ubiquitous object.

In 615, the resource management apparatus may perform authentication and authorization on the ubiquitous object, and may verify an SLA corresponding to the requested service.

In 620, the resource management apparatus may analyze the properties of the requested service, and may determine the type of the requested service based on the results of the analysis. The classification of a service has already been described above, and thus, a detailed description thereof will be omitted.

In 630, the resource management apparatus may search for cloud resources available for services of the same type as the requested service. Searching for cloud resources has already been described above, and thus, a detailed description thereof will be omitted.

In 640, the resource management apparatus may synchronize the ubiquitous object with cloud resources that are found in 630.

For example, the synchronization of the ubiquitous object with the cloud resources that are found in 630 may be allocating the found cloud resources to the ubiquitous object, reserving the found cloud resources for the ubiquitous object, or modifying the found cloud resources for the ubiquitous object.

For example, the allocation of cloud resources may be performed in response to the requested service being related to the use of resources. For example, the reservation of cloud resources may be performed in response to the requested service being related to the reservation of the use of resources. For example, the modification of cloud resources may be performed in response to the requested service being related to the modification of resources.

As described above, it is possible to effectively manage resources such that a ubiquitous object can perform cloud-based communication. Therefore, it is possible to provide any desired amount of cloud resources to a ubiquitous object that is equipped with limited resources and thus to allow the ubiquitous object to smoothly communicate with a correspondent object.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A resource management apparatus for supporting cloud-based communication between ubiquitous objects, the resource management apparatus comprising:
   a memory;
   a processor to:
   classify a service requested by a ubiquitous object based on properties of the requested service;
   search for cloud resources available for the requested service that is classified;
   synchronize the ubiquitous object with the cloud resources that are found based on the search,
   determine when the requested service is a type-1 service that is an urgent service that requires an immediate allocation of cloud resources;
   determine when the requested service is a type-2 service that is a periodic service that repeats at regular intervals of time;
   determine when the requested service is a type-3 service that is an on-demand service; and
   determine when the requested service is a type-4 service that is a usage service with a predetermined pattern, and
   classify the requested service as one of type-1, type-2, type-3, and type-4.

2. The resource management apparatus of claim 1, further comprising:
   a resource management table configured to include cloud resource identification information, cloud resource type information, cloud resource location information, cloud resource availability information, and cloud resource reservation information.

3. The resource management apparatus of claim 2, wherein the processor is configured to search for the cloud resources available for services that are classified with reference to the resource management table.

4. The resource management apparatus of claim 2, wherein the processor is configured to update the resource management table after synchronizing the ubiquitous object with the cloud resources that are found by the search.

5. The resource management apparatus of claim 2, wherein the processor is configured to monitor periodically cloud resources and update the resource management table.

6. The resource management apparatus of claim 1, further comprising:
a service management table configured to include ubiquitous object identification information, service type information, cloud resource type information, cloud resource location information, and priority information.

7. The resource management apparatus of claim 6, wherein the processor configured to record ubiquitous object identification information corresponding to the ubiquitous object, service type information, cloud resource type information corresponding to cloud resources requested by the ubiquitous object, and priority information corresponding to a type of the requested service in the service management table.

8. The resource management apparatus of claim 6, wherein the processor configured to record cloud resource location information corresponding to the cloud resources that are found by searching, in the service management table after synchronizing the ubiquitous object with the cloud resources that are found by the search.

9. The resource management apparatus of claim 1, wherein the processor is configured to allocate the cloud resources that are found by the search, to the ubiquitous object.

10. The resource management apparatus of claim 1, wherein the processor is configured to reserve the cloud resources that are found by the search, for the ubiquitous object.

11. The resource management apparatus of claim 1, wherein the processor is configured to modify the cloud resources that are found by the search, for the ubiquitous object.

12. The resource management apparatus of claim 1, wherein the processor is configured to perform authentication and authorization on the ubiquitous object.

13. The resource management apparatus of claim 1, wherein the processor is configured to verify a service level agreement (SLA) corresponding to the requested service.

14. A resource management method of a resource management apparatus for supporting cloud-based communication between ubiquitous objects, the resource management method comprising:
receiving a service request from a ubiquitous object;
analyzing properties of a service requested by the ubiquitous object and to classify the requested service based on the results of the analysis;
searching for cloud resources available for services that are classified as being of the same type as the requested service;
synchronizing the ubiquitous object with cloud resources that are found;
determine when the requested service is a type-1 service that is an urgent service that requires an immediate allocation of cloud resources;
determine when the requested service is a type-2 service that is a periodic service that repeats at regular intervals of time;
determine when the requested service is a type-3 service that is an on-demand service;
determine when the requested service is a type-4 service that is a usage service with a predetermined pattern, and
classify the requested service as one of type-1, type-2, type-3, and type-4.

15. The resource management method of claim 14, wherein the synchronizing of the ubiquitous object with the available cloud resources that are found, comprises allocating the available cloud resources to the ubiquitous object.

16. The resource management method of claim 14, wherein the synchronizing of the ubiquitous object with the available cloud resources that are found, comprises reserving the available cloud resources for the ubiquitous object.

17. The resource management method of claim 14, wherein the synchronizing of the ubiquitous object with the available cloud resources that are found, comprises modifying the available cloud resources for the ubiquitous object.

* * * * *